Aug. 25, 1942.  M. ENGLER  2,293,721
METHOD OF AND APPARATUS FOR CUTTING AND SPLICING THICK
RUBBER STOCK AND THE LIKE
Filed Aug. 11, 1941
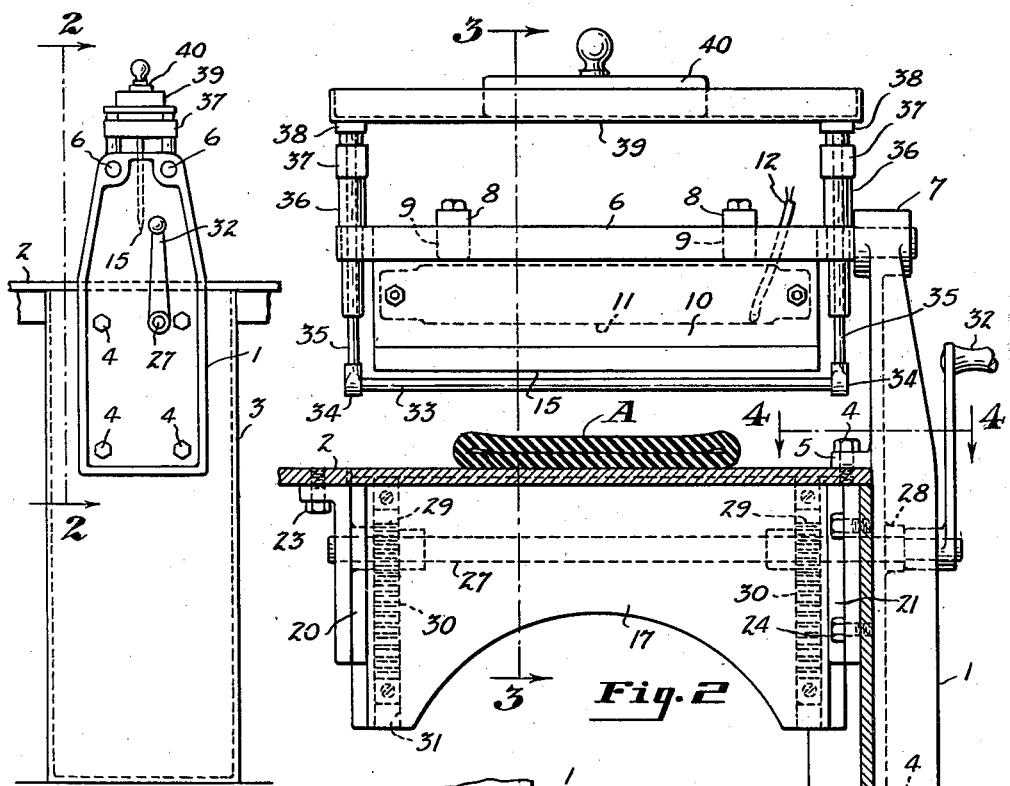
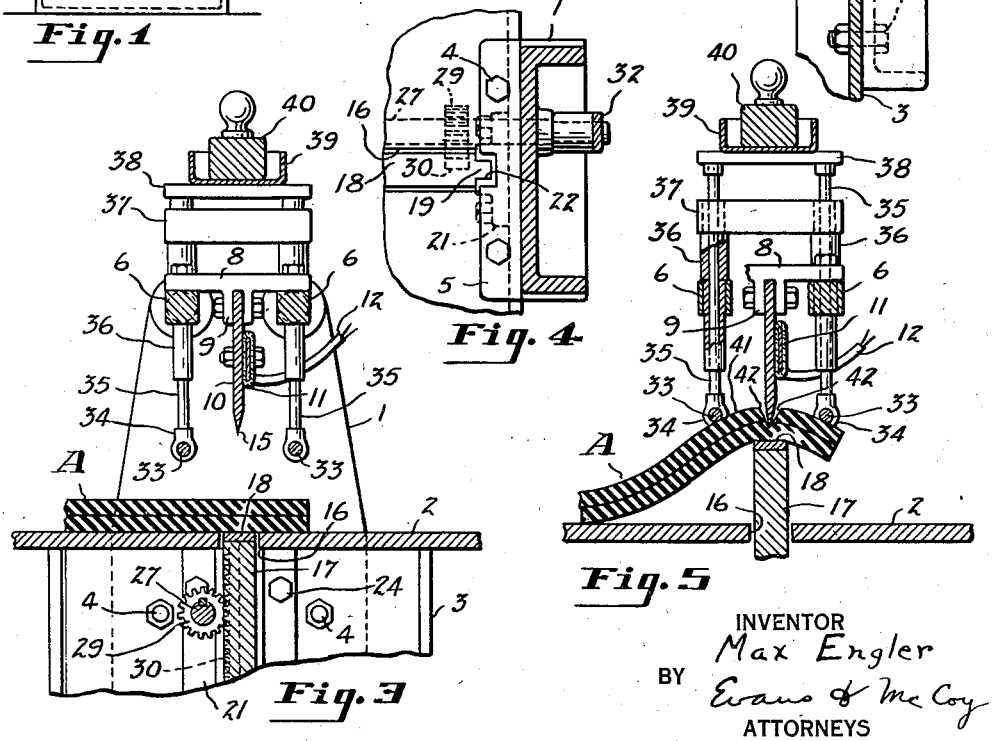
INVENTOR
Max Engler
BY Evans & McCoy
ATTORNEYS Patented Aug. 25, 1942

2,293,721

UNITED STATES PATENT OFFICE 2,293,721

METHOD OF AND APPARATUS FOR CUTTING AND SPLICING THICK RUBBER STOCK AND THE LIKE

Max Engler, Akron, Ohio, assignor to The General Tire & Rubber Company, Akron, Ohio, a corporation of Ohio Application August 11, 1941, Serial No. 406,288

9 Claims. (Cl. 164—47).

This invention relates to a method of and an apparatus for cutting or severing relatively thick stock of elastic and deformable material, and has particular reference to such a method and apparatus for cutting thick rubber stock, so that as the cutting progresses the severed surface portions of the stock are drawn away from the knife and objectionable permanent distortion of the stock adjacent the cut is avoided.

In the cutting of relatively thick rubber stocks, such, for example, as the uncured tube material that is used in the manufacture of vulcanizing air bags for pneumatic tires, difficulty has been experienced in trimming the ends of the tubular stock because of deforming the tube adjacent the cut if a quick blow of the knife is employed, and because of burning the rubber if the heated knife is moved slowly through the stock. It is, therefore, an object of the present invention to provide an improved method and apparatus for cutting thick stock of rubber material or the like in which deformation of the stock incident to the cutting is minimized and objectionable burning of the stock by the heated cutting knife is avoided. Tensioning of the rubber prior to and during cutting is also an object of the invention. More specifically, the invention contemplates the bending of the thick stock during the cutting so that the inherent resiliency of the material causes the severed surfaces to be drawn apart and away from the cutting knife.

Another object is to provide a cutter for thick stock of elastic and deformable material in which the cutter is flanked by pressers that engage and bear against the stock being cut at points spaced laterally from the cutter.

A further object is to provide a thick stock cutter in which a narrow bed plate or backing member is used in combination with spaced pressers for bending the stock about the backing member or bed plate during the cutting operation.

A still further object is to provide apparatus for cutting thick stock which is simple in design and construction and relatively inexpensive to manufacture. Other objects and advantages will become apparent as the description proceeds. This description is made in connection with the accompanying drawing, wherein:

Figure 1 is an elevational view of the cutter of the present invention mounted on a horizontal table for supporting the thick stock to be severed. In the present case the stock is the extruded tube material used in making vulcanizing air bags for vehicle tires;

Fig. 2 is a vertical sectional view of the apparatus, with parts removed, taken substantially on the line indicated at 2—2 of Fig. 1 and enlarged with respect to that figure;

Fig. 3 is a vertical sectional view with parts broken away taken substantially on line 3—3 of Fig. 2;

Fig. 4 is a fragmentary horizontal sectional detail taken substantially on the line 4—4 of Fig. 2; and Fig. 5 is a vertical sectional view similar to Fig. 3 showing the apparatus in the operation of severing the thick tube stock.

Referring now to the drawing by numerals of reference which indicate like parts throughout the several views, the cutter for carrying out the process herein contemplated and embodying the principles of the present invention comprises an upright supporting member 1 which may be suitably made as a steel casting connected to one edge of a horizontal table 2 and to vertical channel shaped table support 3 by means of bolts 4, the member 1 having a laterally extending lip 5 which overhangs and rests upon the table top 2. A pair of spaced parallel bars 6 are disposed horizontally above the table top 2 and are supported cantilever fashion by the upright member 1. These bars may be of square cross section, having round ends which are secured as by pressing into suitable openings formed in thickened upper end 7 of the vertical support member 1. Spaced cross members 8 secured at their ends to the parallel bars 6 are formed on their undersides with clevises 9 which receive and retain rigidly the upper edge of the cutter 10 by means of bolts. This cutter may be of conventional construction, and the material is preferably a steel alloy containing copper and beryllium so that the knife has high heat conductivity. A heating element 11 is secured to one side of the knife and is connected by wires 12 to a suitable source of electric current so that the knife may be maintained at a proper cutting temperature, in accordance with well known practice. The bottom of the knife 10 is formed with a straight downwardly directed cutting edge 15 which is disposed horizontally in spaced relation above the table top 2 and is generally parallel to the latter.

Beneath the knife 10 the table top 2 is cut away to provide an elongated slot 16 which receives a relatively narrow vertically movable bed plate or backing member 17 fitted along its upper edge with a soft metal facing 18 normally disposed substantially flush with the table top 2. As shown in Fig. 2, the backing member or bed plate 17 is formed at its ends with parallel vertically disposed rail portions 19 that are received in channels 22 of spaced guides 20 and 21. The guide 20 is formed with a horizontal flange portion that is secured to the underside of the table 2 by means of bolts 23, while the guide 21 is secured by bolts 24 to the inside of the table supporting upright 3.

A shaft 27 extends along one side of the backing or bed member 17 and is journaled for rotation in the guide 20 and a boss 28 formed on the upright support member 1. Pinions 29 keyed on the shaft 26 mesh with spaced parallel racks 30 secured in recesses 31 formed in the bed plate member 17. Thus, rotation of the shaft 27, as by means of crank 32, turns the pinions 29 in unison to elevate the bed plate 17, as shown in Fig. 5. The soft metal facing 18 on the bed plate 17 thus engages the underside of the thick stock that is to be cut to raise such stock against the cutting edge 15 of the knife 10. As previously mentioned, the stock to be cut is thick tubular material used in making air bags for inflating pneumatic tires during vulcanization. This thick stock is indicated in the drawing at A. As the stock is raised from the flat position shown in Fig. 3 upwardly and against the downwardly directed cutting edge of the knife, the weight of the stock itself tends to cause a slight bending of the stock over the narrow bed plate, thereby tensioning the upper surface portion of the stock material disposed over the bed plate. Hence when the hot knife 10 cuts into the stock the latter tends to draw away from the sides of the knife blade. This action or tendency is increased by means of pressers 33 which engage the upper surface of the stock, as shown in Fig. 5, prior to engagement of the stock by the knife 10. These pressers may be in the form of metal rods disposed in spaced parallel relation to one another laterally of and on opposite sides of the knife 10. The ends of each presser are secured in fittings 34 mounted on the lower ends of vertically disposed guide rods 35 slidable in guide sleeves 36. These guide sleeves extend through and are supported by the bars 6 and at their upper ends the guide sleeves are connected together in pairs by cross members 37. The upper ends of the guide rods 35 are also connected together in pairs by means of cross members 38, so that the pressers 33 move up and down in unison.

Supported on and extending between the cross members 38 is a trough which receives weights one of which is indicated at 40. The weight 40 forces the rods 35 downwardly in the guide sleeves 36 so that the pressers 33 are held firmly against and rest by gravity upon the top of the stock A. The weight of the pressers 33 and the movable parts of the apparatus associated therewith is thus augmented by the weight 40, so that by changing the weight the force exerted against the upper surface of the stock A may be varied in accordance with the stiffness and thickness of the stock being cut.

The downward movement of the pressers 33 is limited by engagement between bosses on the ends of the cross members 38 and the cross members 37, the length of the guide rods 35 being such that at their lower limit of movement the presser members 33 are disposed below the cutting edge 15 of the knife and sufficiently above the table 2 to permit movement of the stock A into and out of position across the narrow backing member 17.

During operation of the device, the proper weight 40 having been previously selected experimentally and placed in the trough 39, one end of the tubular stock A is passed beneath the overhanging supporting structure carrying the knife 10 and the pressers 33 and across the soft metal facing 18 of the plate or backing member 17 to approximately the position shown in Fig. 3. The crank 32 is then turned to rotate the shaft 27 and thereby raise the bed plate or backing member by means of the pinions 29 and the racks 30, the upward movement of the bed plate being guided by the end edges 19 thereof sliding in the channels 22. As the stock is raised by the backing member, upper surface 41 of the stock is engaged at points spaced laterally beyond the sides of the bed plate or backing member by the pressers 33 which bend the stock over the backing plate to tension the upper surface of the stock. The pressers 33 engage the stock prior to the knife 10 so that at the instant the severing operation is commenced the surface 41 of the stock A is under tension, and as the heated knife 10 progresses through the elastic and deformable stock the freshly cut surfaces of the latter, indicated at 42, are drawn away from the sides of the knife by the tension in the stock, thus preventing prolonged engagement between the stock and the knife and eliminating objectionable burning of the freshly cut surfaces.

During the cutting operation in which the stock is pressed upwardly against the cutting edge 15 of the knife by the continued upward movement of the backing member or bed plate 17, the pressers 33 have a floating action by reason of the sliding of the rods 35 in the sleeves 36. Thus, the pressers 33 resting by gravity on the upper surface 41 of the stock A may move up or down during the cutting operation, depending upon the stiffness of the stock A and the size of the weight 40.

In the making of air bags for use in vulcanizing pneumatic tires, a suitable length of the stock A is placed on the table 2. The ends of the stock are trimmed by means of the cutter described above and the freshly cut tacky ends are then brought into juxtaposition and then pressed together to form a splice in accordance with well known practice.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration without intending to limit the scope of the claims to the specific details disclosed.

What I claim is:

1. In the method of cutting relatively thick stock of rubber or the like by a heated knife, the improvement which comprises applying pressure to the stock opposite to the direction of the cut and approximately in the plane of the knife and also in the direction of the cut at points spaced laterally from the cut for the purpose of progressively bending the stock as the cutting proceeds whereby the freshly cut surfaces of the stock are drawn away from the heated knife to avoid burning of the stock.

2. In the method of cutting relatively thick stock of rubber or the like by a heated knife, the improvement which comprises progressively bending the stock as the cutting proceeds and along the line of the cut to draw the freshly surfaces of the stock away from the heated knife whereby burning of such surfaces by the knife is avoided.

3. Apparatus for cutting relatively thick stock of rubber or the like comprising a backing member, a knife and means for heating the same, means for moving the knife and said member relatively toward one another for severing stock disposed therebetween, a pressure member spaced laterally from the knife for engaging the stock on the opposite side of the latter from the backing member, and means so mounting said pressure member as to apply pressure to the engaged stock during the cutting for bending the stock whereby the freshly cut surface of the stock is drawn away from the knife to avoid burning of the stock.

4. Apparatus for cutting relatively thick stock of elastic deformable material comprising a knife, a narrow backing member, means mounting the knife and the backing member for relative movement toward one another in severing stock interposed therebetween, pressers disposed along opposite sides of the knife in generally spaced parallel relation to the cutting edge of the knife, and means mounting the pressers to yieldingly bear against the stock during the cutting and along lines spaced beyond the side edges of the backing member whereby the stock is bent around the backing member during the cutting and the freshly cut surfaces of the stock are drawn away from the sides of the knife.

5. Apparatus for cutting relatively thick stock of elastic deformable material comprising a table for supporting the stock, a substantially straight knife and means supporting the straight knife in a substantially fixed position over the table, a narrow backing member disposed substantially in the plane of the table and beneath the knife, and means having connection with the backing member and operable to raise the same against the knife whereby stock on the table and extending across the backing member is elevated by the latter to cause cutting of the stock against the fixed knife.

6. Apparatus for cutting relatively thick stock of elastic deformable material comprising a table for supporting the stock, a knife and means supporting the same over the table, a narrow backing member disposed substantially in the plane of the table and beneath the knife, means having connection with the backing member and operable to raise the same against the knife whereby stock on the table and extending across the backing member is elevated into engagement with the knife to be severed by the latter, and presser means spaced laterally of the knife and supported for yielding upward movement to bear downwardly against stock raised by the backing member during the severing at points spaced beyond the edges of the backing member to thereby bend the stock over the backing member.

7. Apparatus for cutting relatively thick stock of elastic deformable material comprising a table for supporting the stock, a supporting structure extending over the table and spaced above the latter, a knife mounted on the structure and having a downwardly directed cutting edge, a backing member normally disposed beneath the knife approximately at the level of the table, means having connection with the backing member and operable to raise the same against the knife edge for lifting stock to be severed, and pressers mounted on the structure for yielding movement over paths spaced laterally from the knife to engage the top of stock lifted by the backing member.

8. Apparatus for cutting relatively thick stock of elastic deformable material comprising a table for supporting the stock, a supporting structure extending over the table and spaced above the latter, a knife mounted on the structure and having a downwardly directed cutting edge, a backing member normally disposed beneath the knife approximately at the level of the table, means having connection with the backing member and operable to raise the same against the knife edge for lifting stock to be severed, pressers mounted on the structure for yielding movement over paths spaced laterally from the knife to engage the top of stock lifted by the backing member, and detachable weight means having connection with the pressers for augmenting the pressure with which the pressers engage the lifted stock.

9. Apparatus for cutting relatively thick stock of elastic deformable material comprising table means for supporting the stock, a structure extending over the table means and spaced above the latter, a knife mounted on the structure and having a downwardly directed cutting edge, means for heating the knife, a backing member normally disposed beneath the knife in spaced relation thereto to permit placing of the stock over the backing member, means having connection with the backing member and operable to raise the same against the heated knife edge for lifting and severing the stock, and pressers mounted for yielding movement over paths spaced laterally from the knife to engage stock lifted by the backing member and to draw the freshly cut surfaces of the severed stock away from the heated knife.

MAX ENGLER.